United States Patent [19]

Anderson et al.

[11] Patent Number: 4,783,834
[45] Date of Patent: Nov. 8, 1988

[54] SYSTEM FOR CREATING TRANSPOSED IMAGE DATA FROM A RUN END OR RUN LENGTH REPRESENTATION OF AN IMAGE

[75] Inventors: Karen L. Anderson, Mohegan Lake; Joan L. Mitchell, Ossining, both of N.Y.

[73] Assignee: International Business Machines Corporation, Armonk, N.Y.

[21] Appl. No.: 17,372

[22] Filed: Feb. 1, 1987

[51] Int. Cl.$^4$ ................................. G06K 9/00
[52] U.S. Cl. ............................ 382/46; 340/727; 358/256; 382/56
[58] Field of Search ............ 382/46, 56; 358/22, 358/261; 340/727; 364/521, 519

[56] References Cited

U.S. PATENT DOCUMENTS

| | | | |
|---|---|---|---|
| 4,052,699 | 10/1977 | Micka et al. | 382/46 |
| 4,168,488 | 9/1979 | Evans | 382/46 |
| 4,185,302 | 1/1980 | Mounts et al. | 358/261 |
| 4,517,604 | 5/1985 | Lasher et al. | 358/261 |
| 4,590,606 | 5/1986 | Rohrer | 382/56 |
| 4,593,407 | 6/1986 | Konishi et al. | 382/46 |
| 4,596,039 | 6/1986 | Mitchell et al. | 358/261 |
| 4,647,971 | 3/1987 | Noman, III | 358/22 |
| 4,658,430 | 4/1987 | Anderson et al. | 382/46 |

FOREIGN PATENT DOCUMENTS

60-16767  1/1985  Japan ....................... 382/46

Primary Examiner—Leo H. Boudreau
Attorney, Agent, or Firm—Thomas P. Dowd

[57] ABSTRACT

A system for formatting electronic binary image data, which may be in compressed raster form, into transposed or rotated raster form for storage or output, such as on a printing device, is disclosed wherein the image data is first assembled in a buffer in the form of vectors of run ends representing successive raster scan lines of an original image to be reproduced. The elements of an intermediate buffer are initialized to zero and the data is entered into the intermediate buffer by using each run end to set a bit in the intermediate buffer, with the bits being set in the buffer elements in correspondence with the respective raster positions of the run ends. The elements of the intermediate buffer containing the entered electronic data are then combined, such as by EXCLUSIVE-ORing, to create transposed or rotated raster data, which may stored or input to a suitable output device, such as a printer or display. The raster data may be compressed in the process and other processes, such as image reversal, may be carried out with facility.

22 Claims, 11 Drawing Sheets

Conversion Procedure

FIG. 1 Conversion Procedure

FIG. 2  Processing of One Input Line

FIG. 3  Initialization

FIG. 4 Recording Line Data

FIG. 5   Coding Procedures

FIG. 6A Coding Section Data (1)

FIG. 6B
Coding Section
Data (2)

FIG. 6C Coding Section Data (3)

FIG. 7  Coding Mono-color Sections

Code white section:

Code black section:

FIG. 8 Coding Left Edge Data

If section starts white:

If section starts black:

If section starts mixed (code pad bytes only):

FIG. 9  Initialization for New Section

SYSTEM FOR CREATING TRANSPOSED IMAGE DATA FROM A RUN END OR RUN LENGTH REPRESENTATION OF AN IMAGE

FIELD OF THE INVENTION

This invention relates to the printing and other processing of binary images, and more particularly to systems in which the images are comprised of non-coded digital information in the form of vectors of run lengths or run end positions representing lines of raster bits arranged in a given scan format or direction.

BACKGROUND OF THE INVENTION

Printer systems in which information to be printed is provided in the form of digital data are well known. Typically an image consisting of text or of a limited number of bit patterns may be represented in coded form, with each character represented by a code consisting of a small number of bits (typically 9). The codes are fed into a character generator which creates the bit pattern to be printed. For many graphical or scanned images, however, this form of representation is not practical because of the large number of potential bit patterns. Such images may be made available in raster form, with each image pel represented by a single bit and with the image lines arranged in raster scan order. This raster data is often stored in a compressed form in which the same information is described more compactly. A variety of systems for compressing and decompressing the binary image data are available. For example, available compression methods for binary images include, but are by no means limited to, those disclosed in:

L. R. Bahl, D. I. Barnea, and H. Kobayashi, "Image Compaction System", U.S. Pat. No. 3,833,900, 1974;

T. H. Morrin, "Recursive Contour Coding of Nested Objects in Black/White Images," International Conference on Communications conference records, June 1975, Vol. 1, pp. 7–17;

Y. Nakagome, H. Teramura, Y. Yamasaki, and Y. Wakahara, "System for Coding Information Change Picture Elements in Facsimile Signal", U.S. Pat. No. 4,040,093, 1977, and "Method for Coding Facsimile Signal", U.S. Pat. No. 4,121,258, 1978;

A. J. Frank, "Variable Length Codes for High Quality Image Encoding", U.S. Pat. No. 4,103,287, 1978;

G. Goertzel and J. L. Mitchell, "Two-Dimensional Image Data Compression and Decompression System," U.S. Defensive Publication No. T985,005, Aug. 7, 1979; and R. Hunter and A. H. Robinson, "International Digital Facsimile Coding Standards," Proceedings of the IEEE, Vol. 68, No. 7 (July 1980), pp. 854–867.

The image compression method relevant to the present invention is described in the commonly-assigned, copending U.S. patent application Ser. No. 841,483 of J. L. Mitchell, G. Goertzel, and K. L. Anderson, entitled "Method for Encoding and Decoding a Digital Image".

Many printers are designed to print a number of raster scan lines in parallel. In such systems, the image data is arranged so that each unit of input data describes a set of vertically adjacent image pels, the bits in a unit controlling individual print elements. For example, an eight-bit byte may be used to drive a column of eight print elements. The most significant bit may control the top print element, the second most significant bit the second print element, and so on down to the least significant bit which controls the bottom print element. The stream of bytes needed to drive the printer to create an eight-row unit in such a system is the transpose of the eight lines of raster data to be printed. In some systems, such as the IBM 4250 printer, the transposed raster data may be compressed before being transmitted to the printer. For the IBM 4250 printer this compression consists of coding a repetition count for bytes having the values X'00' and X'FF' in order to reduce the transmission time required to send the large areas of black or white pels which occur in many images.

In order to convert image data from the normal raster scan format to a format suitable for transmission to such a printer, the image must be divided into horizontal strips N pels high, where N is the number of bits which are required to control the available column of print elements. Each horizontal strip must then be transposed, or alternatively rotated 90 degrees counterclockwise, which will produce the same result as transposing except that the bytes are in reverse order. Many systems are available to perform this operation, some of which are described below. To print an image which is stored in compressed form, it is necessary to decompress the image to create the raster data before applying the appropriate methods. Any required compression of the transposed data can be folded into the transposition process or performed as a separate step following it. The transposition and compression of data for the 4250 printer can be performed by existing software packages such as IBM Program Products "IPG" and "Image Handling Facility" (IHF).

Several systems are available which can rotate or transpose raster image data. These include those disclosed in:

P. J. Evans, "Image Rotation Apparatus", U.S. Pat. No. 4,168,488, 1979;

G. Goertzel, K. L. Anderson, F. C. Mintzer, and J. L. Mitchell, "Method for Rotating a Binary Image", U.S. Pat. No. 4,627,020, 1986;

J. B. Lotspiech, "Method and Apparatus for Rotating the Scan Format of Digital Images", U.S. Pat. No. 4,271,476, 1981, which describes a method that can be used to rotate images in raster or compressed form;

T. H. Morrin, "Rotation of Images Using Contour Compressed Data", IBM Technical Disclosure Bulletin, Vol. 18, No. 8 (January 1976), pp. 2640–2642, which discusses rotation of images compressed using contour coding methods; and The present inventors in commonly-assigned U.S. Pat. No. 4,658,430 entitled "System for Rotating a Binary Image", describe a system which accepts data in the run end form used in the present invention and creates a rotated output image in raster form; but this is done by creating the unrotated raster image with the bytes stored in a non-standard order which makes it more convenient to pick up groups of these bytes and rotate them.

The commonly-used methods of decompressing an image and then transposing or rotating the raster data do not take advantage of the fact that in some data compression schemes there exists a representation of the image that is intermediate between the compressed form and the raster data and is produced with less computational effort than the required to create the raster data for the original image. In above-noted, co-pending U.S. patent application Ser. No. 841,483 of J. L. Mitchell et al, entitled, "Method for Encoding and Decoding a Digital Image", this form consists of vectors of run ends representing successive raster scan lines. It is an object of the present invention to take advantage of the existence of this representation to create the transposed or rotated raster image data directly from it, without going through the intermediate stage of creating the untransposed raster image. It is a further object of this invention to perform required alteration of the transposed or rotated raster data as part of the conversion process.

The use of the intermediate representation of the image as input to the transposition process of the invention, while preferred, does not preclude, however, the application of this method to uncompressed raster data, since the raster data can conveniently be converted to the intermediate form. Suitable methods for performing this conversion are described in the commonly-assigned, U.S. Pat. No. 4,610,027 of K. L. Anderson, J. L. Mitchell, and G. Goertzel, entitled "A Method for Converting a Bit Map of an Image to a Run Length or Run End Representation," and in the commonly-assigned, U.S. Pat. No. 4,646,356 of K. L. Anderson, G. Goertzel, J. L. Mitchell, and W. B. Pennebaker, entitled "An Improved Method for Converting a Bit Map of an Image to a Run Length or Run End Representation."

SUMMARY OF THE INVENTION

The system and method of the present invention is directed to taking an image expressed in run end or run length form and converting it to a series of transposed horizontal strips, with optional compression of the resulting data. Accordingly, the rows of a binary image are represented as vectors of run end positions. N lines of the image are processed at a time, where N is the number of rows per section to be transposed. A buffer is set up which contains a series of N-bit units or elements which are initially all zero. Each run end in each of the N rows is used to set a bit in the buffer, in an element corresponding to the raster position of the run end, which will cause the pel color to change in the appropriate row when the buffer entries are EXCLUSIVE-OR'd together. Then, after all of the N rows of input have been processed, the elements of the buffer are EXCLUSIVE-OR'd together in sequence to produce the units of transposed data. If compression of the transposed image is required, it may be combined with the exclusive-or process to modify the output produced by that operation.

The invention also allows data from the extremes of the lines, i.e., the beginning and/or end of each input image line, to be discarded, and allows insertion of "padding" pels at the beginning and/or end of each input image line as the output is created. Discarding of original image data is accomplished by ignoring all run ends outside of the range of interest. Padding is done by adding the pad data before and/or after the exclusive-or loop and optional compression are done, to put pad data at the beginning and/or end of each line. Some "knitting" may be required to combine the padding with the real data if compression of the transposed data is being done.

Another feature of the invention is the capability of allowing the input image to be reversed, i.e. converted from black-on-white to white-on-black or vice versa. This is accomplished by inverting the first element in the buffer in which the elements are EXCLUSIVE-OR'd to produce the transposed image, which causes all subsequent results to appear in inverted form.

A further feature of the invention is that in addition to performing the described transpositions, it also can be used, with minor modifications well within the ability of a skilled programmer, to rotate an image by 90 degrees.

A preferred embodiment of the present invention utilizes a programmed general-purpose computer such as an IBM System/370 or PC, in combination with an IBM 4250 printer.

DETAILED DESCRIPTION OF A PREFERRED EMBODIMENT OF THE INVENTION

Before proceeding with a description of the details of the invention, it is useful to describe the run end representation used for the input data and the compression scheme used to prepare the transposed data for transmission to the IBM 4250 printer which will be used as an exemplary output device.

Binary images are divided into individual units called pels, which are typically arranged along raster scan lines. Each pel is either white or black. In most documents, pels tend to be grouped into "runs", i.e. sequences of pels having the same value. There may be a run of white pels at the margin, followed by a run of black pels where the first character or line is encountered, followed by another run of white pels for the white space separating the first character or line from the next, and so on across the page. A "run length" is the number of pels in a run. A run end is the displacement in pels from the left edge of the image to the last pel in a run and is the cumulative sum of the lengths of a given run and all of the runs to the left of it. The present invention may be used to generate transposed or 4250-format data from either run ends or run lengths. The description which follows will assume that run ends are supplied. To convert run lengths, a cumulative total of the run lengths processed would be kept.

The preferred embodiment of the invention uses a line or run end buffer for each input line which contains a series of halfwords. The 16 bits in the halfword are adequate to represent images with widths up to 64K. The first halfword in each run end buffer gives the number of bytes of run end data plus two bytes for the count (i.e. the total number of bytes of data in the buffer); this is followed by three zero run ends, an arbitrary number of pairs of white/black run ends, and two additional copies of the last black run end. If the image row begins with a black run, the first white run end must be specified as zero. If the image row ends with a white run, the last black run end will be the same as the last white run end, so that in fact there are three copies of the last real run end. For example, the run end buffer containing the halfword entries

| 24 | 0 | 0 | 0 | 0 | 10 | 27 | 28 | 32 | 32 | 32 | 32 |    |    |
|----|---|---|---|---|----|----|----|----|----|----|----|----|----|
| 16 | 0 | 0 | 0 | 32| 32 | 32 | 32 |    |    |    |    |    |    |
| 32 | 0 | 0 | 0 | 0 | 1  | 2  | 3  | 8  | 9  | 12 | 28 | 31 | 32 | 32 32 | would correspond to the following bit image:

| 11111111 | 11000000 | 00000000 | 00010000 |
| 00000000 | 00000000 | 00000000 | 00000000 |
| 10100000 | 10001111 | 11111111 | 11110001 |

The format of the data sent to the 4250 printer is as follows. The image is divided into groups of eight lines each, called "sections". Each section is represented by one record containing the image data in a coded form. A record consists of a header followed by the bytes of data. The data bytes may be visualized as the result of a transpose of the section bits, resulting in a column 8 bits wide and NPELS bits deep, where NPELS is the number of pels in a line. The eight bits in each row of this matrix are packed into a byte, and the column is read from top to bottom. The data bytes are compressed as follows. If a byte is all white (X'00') or all black (X'FF'), the byte is placed in a section or output buffer followed by a count of the total number of contiguous bytes of that type. The count is stored in a byte, so if there are more than 255 bytes in the string, additional copies of the original byte followed by counts are stored to make up the complete number of bytes. Thus a string of 512 white bytes would be coded as "00 FF 00 FF 00 02". There is no compression of bytes which are not either all white or all black; they are simply copied into the section buffer.

Certain aspects of the creation of the output data are not addressed by the method described in this disclosure. For example, in some applications it is necessary to block the section records into units of a fixed size. In general the section record sizes will not correspond to the block size, e.g., one block may contain several section records, or one section record may extend over several blocks. The mechanics of the blocking are considered to be apparent to a skilled programmer and not particularly relevant to the subject of this disclosure. Similarly, the construction of the section record headers is straightforward (given the required format) and will not be discussed further.

Figure 1:
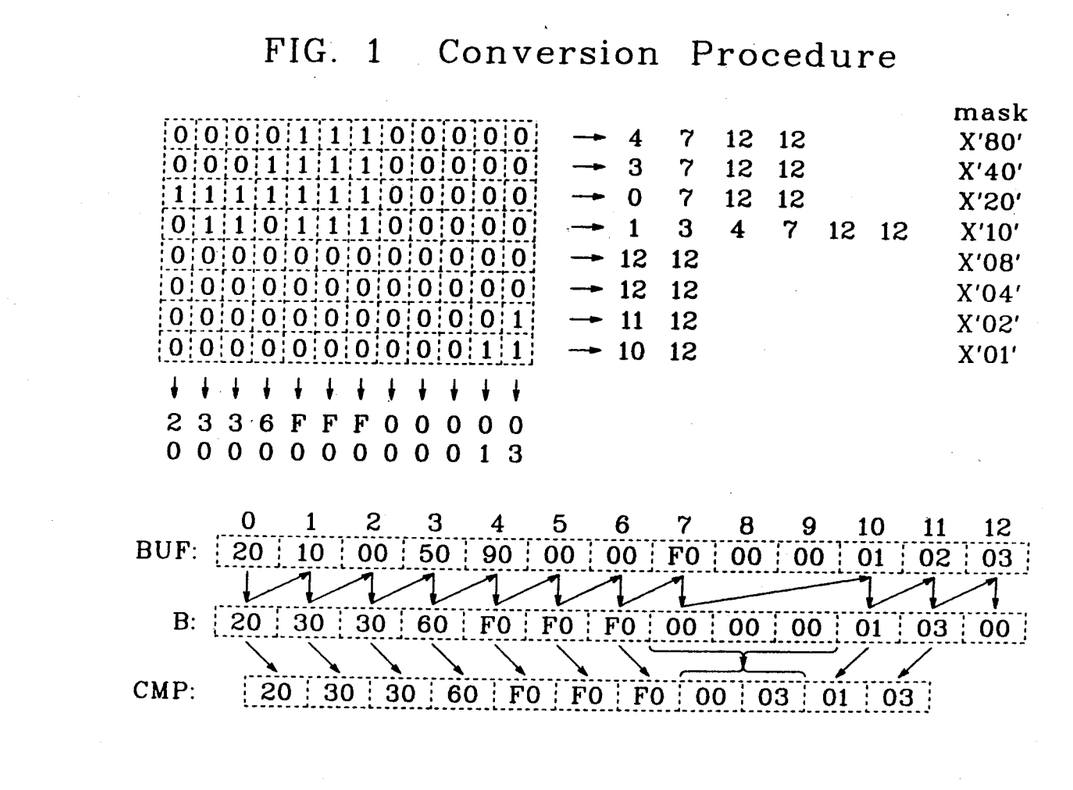
FIG. 1 illustrates the run end to compressed transposed raster conversion according to the method of the present invention.

The basic procedure for coding one section (omitting edge trimming and padding) is illustrated in FIG. 1. The run end representation is shown to the right of the original bit image. In this representation the length field, three leading zeroes, and two trailing copies of the last run end are omitted. The hexadecimal values below the bit image are the bytes of the transposed matrix. To transpose the section information, an intermediate buffer, BUF, containing NPELS+1 bytes (numbered from 0 to NPELS) is first zeroed. The eight lines of run end data are then processed one at a time. For each run end R<NPELS in a given line, the Rth byte in the buffer is OR'd with a mask. A different mask is used for each input line; the masks are shown at the far right. The mask sets a bit in the appropriate byte of BUF each time a white/black or black/white transition occurs. If the last pel of the line is black, the mask is OR'd with the last byte in BUF. After all eight lines have been processed in this manner, the buffer BUF has the following properties:

1. BUF(0) contains the first data byte in the line.
2. The output byte at any position I>0 in the stream of output bytes (before compression) can be obtained by doing an EXCLUSIVE OR of the output byte at position I−1 with BUF(I).
3. When the last output byte in the line is EXCLUSIVE OR'd with BUF(NPELS), the result is zero Conditions 1 and 2 arise because of the way the buffer is constructed: each color change on a given line has been indicated by a one in the bit position corresponding to that line in the byte at the position of the color change, and an EXCLUSIVE OR with that one bit causes a color change in the output byte. Condition 3 is set up so that it is not necessary to test for the end of a line unless the current output byte is zero.

After the intermediate buffer BUF has been constructed from the eight lines of input data, it must be read out to produce the transposed data and, if desired, compressed according to the 4250 compression algorithm. A byte B is initialized with the value BUF(0) and EXCLUSIVE OR'd with the successive elements of BUF. The value of B after each operation is shown in the row labelled "B"; note that these bytes are the rows of the transposed input matrix (i.e. the columns of the original image). To compress the transposed data for the 4250 printer, B is examined after each calculation. If B is zero, a test is made to determine whether the end of the line has been reached; if so, processing is complete. Otherwise, if B is black or white (X'FF' or X'00'), BUF is scanned to determine how many bytes of the same color are in this field. As long as the elements of BUF are zero, the value of the output byte will not change; the first nonzero byte in BUF marks the end of the field. After the field length is determined, it is coded as described above, and processing continues with the next byte. If B is not black or white, it is stored in the compressed data buffer CMP and processing continues with the next byte.

The conversion algorithm for the 4250 printer has been implemented as a function which accepts one input line at a time and creates a compressed buffer for a section after every eighth line. This embodiment described could be modified by removing the compression for the 4250 printer in order to produce transposed raster data for use with a more conventional printer. The function makes use of an area of storage provided by the calling function to save the intermediate buffer and various flags and other data between calls. Variables saved in this area include:

IFLAG Flag set to a nonzero value by the caller before the first call to the conversion function for a given image to cause initialization of the conversion function variables. After initialization the flag is set to zero.

PT Pointer to the run end buffer describing the line being processed. After all input lines have been processed, the function is called with PT=0 to flush out the final section data if necessary.

MASK Mask OR'd with intermediate buffer bytes for the current line

SKIP Number of pels to skip on the left edge of the input line

NC Number of bit columns from the input image to be coded for the 4250

IC Number of bit columns in the image described by the run end buffers

LFT Number of bits to pad on the left

RT Number of bits to pad on the right

PCLR Color of padding bits: 0=white, otherwise black

REV Set to nonzero value for reverse video

LIM Column number of last bit column of input data to be used

MAX Largest run end in current section which is less than LIM

MIN Smallest run end in current section which is greater than SKIP

OPT Pointer to output (compressed data) buffer

BP Pointer to element of BUF currently being coded

LIMBP Upper limit for value of BP.

Figure 2:
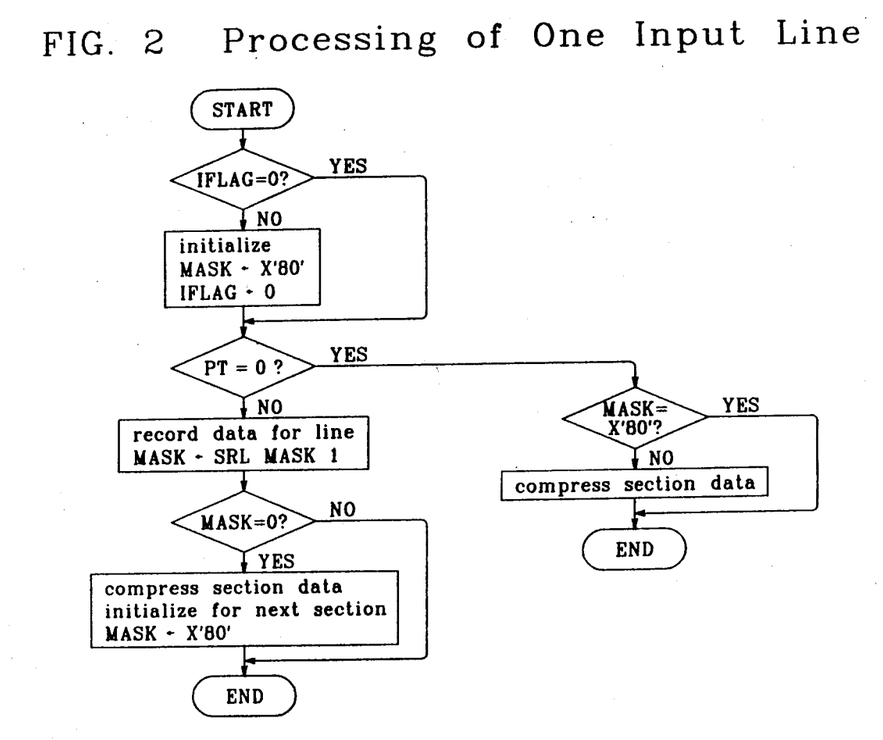
FIG. 2 is a flowchart showing the procedure for transposing and compressing a line of input data.

The structure of the conversion function is illustrated in FIG. 2. First, the flag IFLAG is examined to determine if it is necessary to initialize the conversion function variables; if so, the initialization is performed and IFLAG is reset. Then the pointer to the next line of input is tested to see if a line of data has been supplied. If not, the entire input image has been processed and it is necessary to put out the final partial section of data if there is one. This is determined by testing MASK to see if its value is X'80'. If so, then the last line processed resulted in the creation of a compressed section and so no action is required; otherwise the intermediate buffer is processed to create a compressed section. Because BUF is initially zeroed and there has been no opportunity to set low-order bits in its elements, the section is constructed as if the bottom of the image had been padded with all-white lines.

If a line of input data has been supplied, the run end data is recorded in BUF and MASK is shifted right one bit to create the mask for the next line. If the one bit is shifted out of MASK, then eight input lines have been processed since the last section was compressed and it is time to compress the data for the current section.

After this is done, some initializations are performed in preparation for processing the next section and MASK is reset to set the high-order bit in intermediate buffer bytes when the next line is processed.

Figure 3:
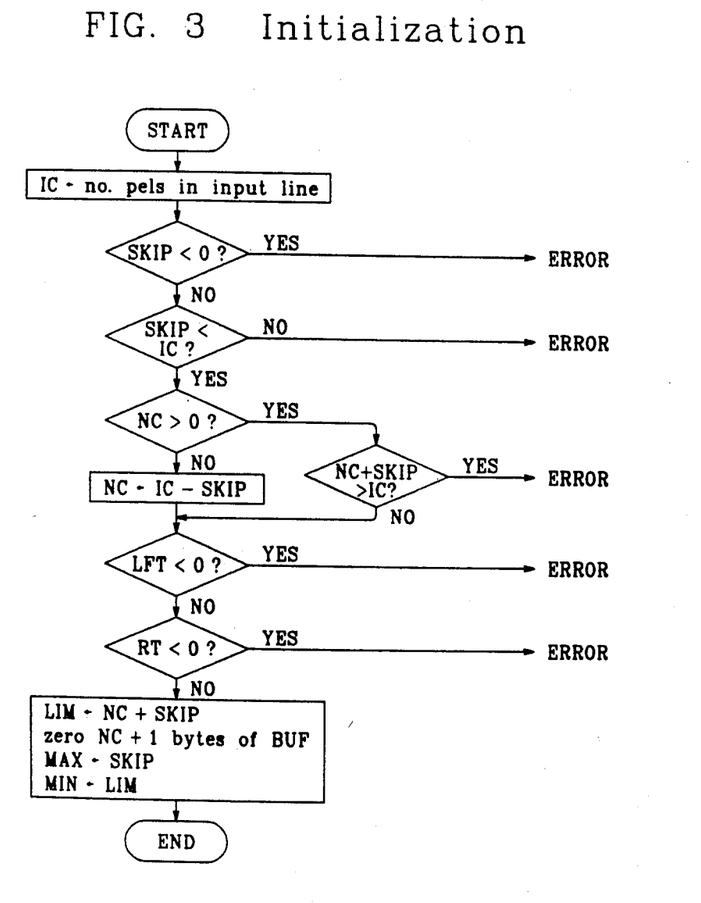
FIG. 3 is a flowchart showing the initialization procedure.

FIG. 3 shows the initialization required before processing the first line of the input image. The number of pels in the input line (obtained from the last halfword in the input buffer) is saved. Tests are then performed to ensure the SKIP is nonnegative and that NC is positive, i.e. some data from the input image is used. The condition "NC+SKIP<=IC" must also be satisfied, which is to say that there are enough pels in the input data lines to supply the required number of pels for the output image. The implementation of the invention allows the calling function to specify NC<=0 to indicate that all available data is to be used, and the calculation IC-SKIP (total pels available minus number of pels to be skipped) resets the value of NC in this case. The numbers of pels to pad on the left and on the right are required to be nonnegative. Once the input has been accepted as valid, the value of LIM (the last pel position to be used in the input data) is calculated, the intermediate buffer BUF is zeroed, and MAX AND MIN are initialized for the first section.

The conditions labelled "ERROR" in FIG. 3 may be handled in various ways, according to the judgement of the programmer. They can cause an abort, simply telling the calling function that it will have to get better data and try again. Some of the values can be defaulted if desired; for example, SKIP, LFT, and RT could each default to zero if a negative value is given. If SKIP+NC is greater than IC, the difference could be subtracted from NC and added to the value of RT to produce an image of the width requested but with additional padding, or the size of the output image could be reduced to correspond to the amount of data available. Thus the implementation of this operation is open to considerable variation, but it is assumed during the execution of the remainder of the function that the input values satisfy the conditions described.

The operation of recording transitions is performed on each input line. In addition to recording the transitions, this process keeps a record of the minimum run end MIN found in the section which is greater than SKIP and the maximum run end MAX which is less than LIM. These values are useful because they make it unnecessary to scan to obtain the lengths of the leading and trailing single-color sections (if any). Since many documents have wide borders, such as the margins on a page of typewritten text, the elimination of the scanning of the edge regions often results in a significant savings of processing time.

Before describing the process in detail, the addressing of the intermediate buffer BUF will be discussed. Note that BUF must be large enough to contain one (byte) element for each bit of real data (as opposed to pad bits) in a line of the output image. It is not necessary to allow space for columns of input image data which are to be skipped. If such space is not allocated, then the index of a byte to be altered to recored a run end at position P in the input image is P-SKIP. However, it is inefficient to perform this subtraction once per run end processed. A better solution is to define a second buffer, XBUF, at an offset of SKIP from the beginning of BUF, so that XBUF(P) and BUF(P-SKIP) describe the same byte in storage. The recording of transitions from the run end data can be performed using the buffer XBUF, and the compression of the resulting intermediate data can be accomplished using the "real" buffer BUF. In the present implementation the values of MAX and MIN are collected as the input lines are processed; during this phase their values lie between SKIP and LIM. Before the compression phase begins they are normalized so that they fall between 0 and NC.

Figure 4:
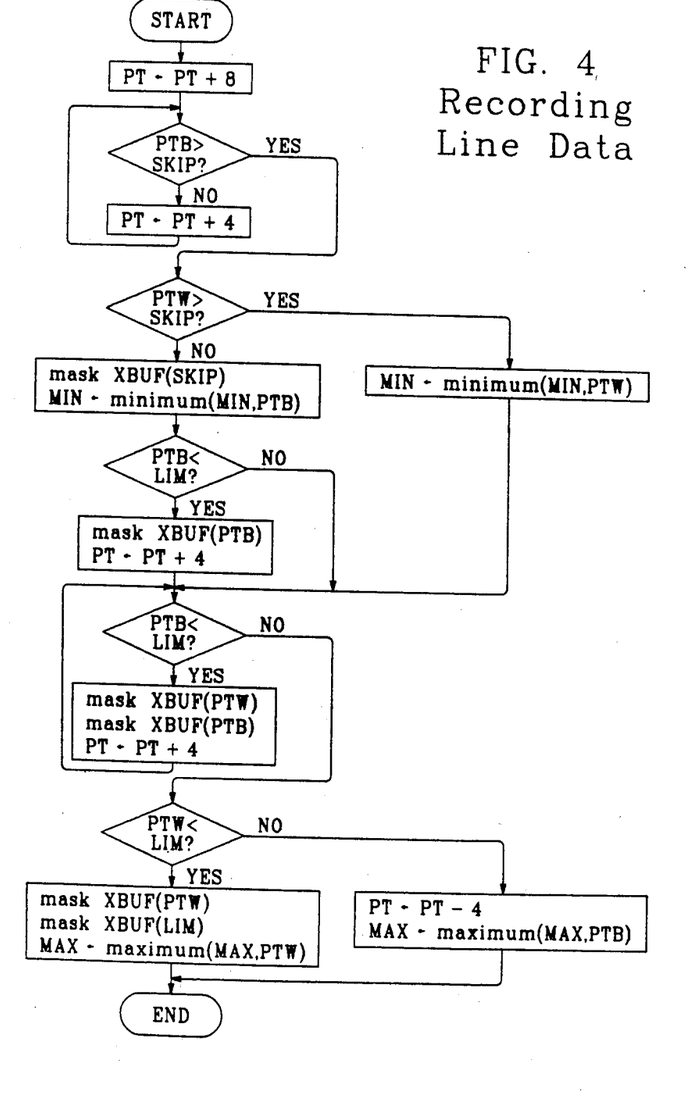
FIG. 4 is a flowchart showing the method for recording the transitions in a line of input data.

FIG. 4 details the process of recording transition data from an input line in the intermediate buffer XBUF. Before beginning this procedure it may be desirable to check to be sure that the image line described by the run end buffer contains the expected number of pels (IC). The pointer to the run end data (PT) is incremented by 8 to skip over the length field and the initial three zero run ends. PT now points to a white/black run end pair. The white and black run ends will be referred to as PTW and PTB, respectively. PT is then incremented by 4 until the black run end it addresses is greater than SKIP. At this point the white run end PTW may be greater than SKIP, in which case the portion of the line which is to be used begins with a white run, or it may be less than or equal to SKIP, in which case the portion of interest begins with a black run.

If the portion of the line to be used begins with a white run, it is necessary only to check the white run end to see if a new minimum has been found before entering the main loop. If the line begins with a black run end, a transition to black at position SKIP (the position from which the first output byte is read) is stored. This process, indicated as "mask XBUF(x)" in the illustration, is done by the operation "XBUF(x)=XBUF(x) OR MASK". The black run end is then compared to the minimum to see if a new minimum has been found. If the black run does not extend to the end of the line, the point where it ends is marked in the intermediate buffer, and PT is incremented to address the next pair of run ends.

The main loop is then entered. As long as the black run whose run end is addressed by PT does not extend to the end of the line, the ends of the white and black runs are marked in the intermediate buffer.

On exit from the main loop, PTW may be less than the maximum input pel position to be used, in which case the line ends with a black run, or it may be greater than or equal to that value, in which case the line ends with a white run. If the line ends with a black run, the position of the white run end is marked in the intermediate buffer, a transition from black to white is marked in the byte at the end of the buffer, and the white run end is compared with MAX to determine if a new maximum has been found. If the line ends with a white run, PT is backed up one pair of run ends and the previous black run end is compared with MAX to see if a new maximum has been found. This completes the recording of transitions from one line of input data.

Figure 5:
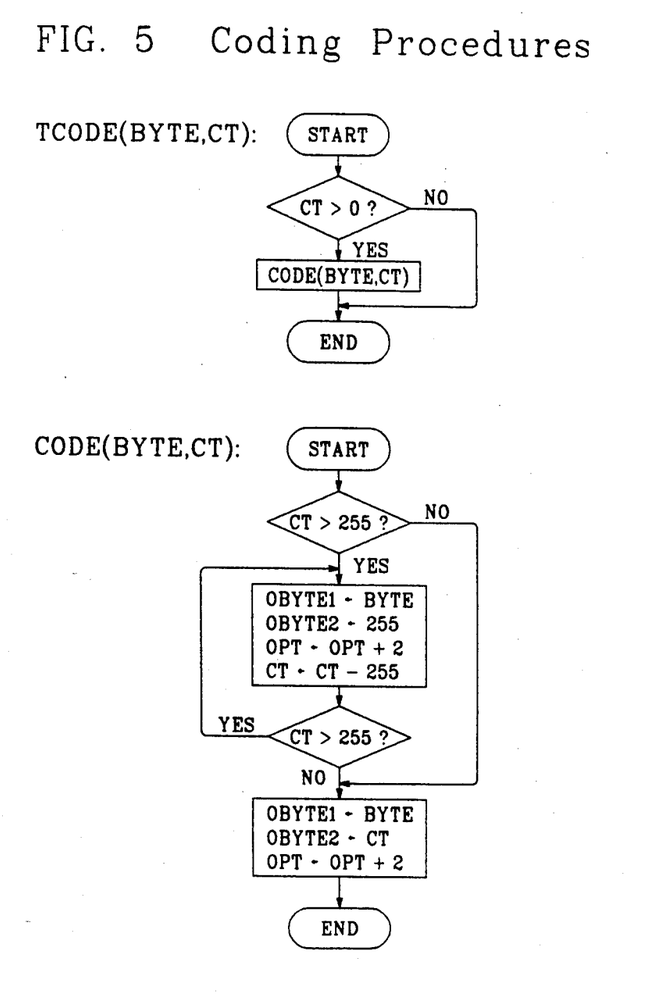
FIG. 5 is a flowchart showing two subprocedures used for compressing sequences of X'00' or X'FF' bytes.

After the transitions for eight input lines have been recorded, the data in BUF must be used to create a compressed data buffer representing the completed section. Before describing this process, two subfunctions used to code black or white data bytes will be introduced. They are illustrated in FIG. 5.

The first of these procedures is called TCODE, for "test and code". It takes as arguments the byte to be coded (either X'00' or X'FF') and the number of copies of that byte which appear as columns in the output image. The number of copies (CT) is tested to determine if it is greater than zero; if so, the second coding procedure is called to code the field.

The second coding procedure, CODE, is used when the number of copies of the byte to be coded is known to be greater than zero. It requires the same arguments as TCODE. If CT is greater than 255, it must be broken down into units of 255, each of which is coded separately. This is done by a loop which stores the byte and a count of 255, increments the output pointer, and decrements CT by the 255 bytes just coded. This process continues until CT becomes less than or equal to 255. At that pont, the byte is stored along with the leftover CT and the output pointer is incremented. If CT is not greater than 255, then the loop is bypassed and only the final storage operation is required.

Figure 6A:
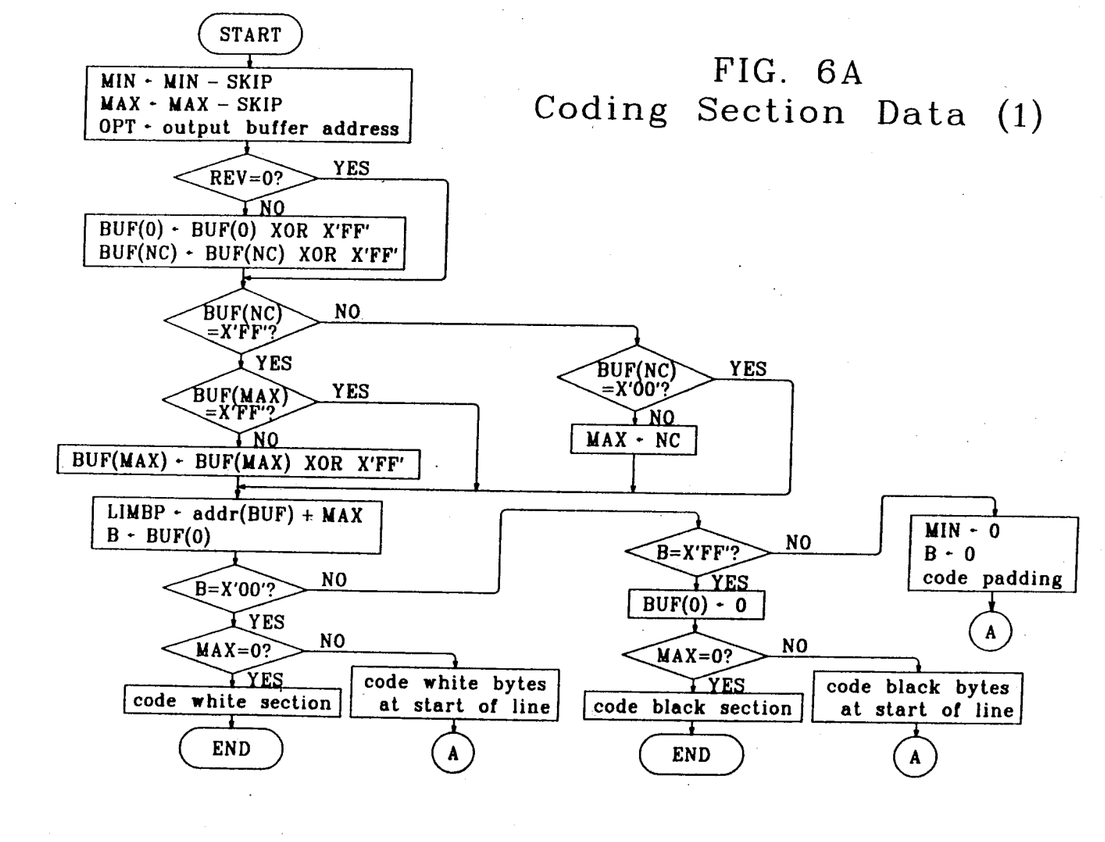
FIGS. 6A, 6B, and 6C show the procedure for converting the recorded transition data to compressed transposed data.
Figure 6B:
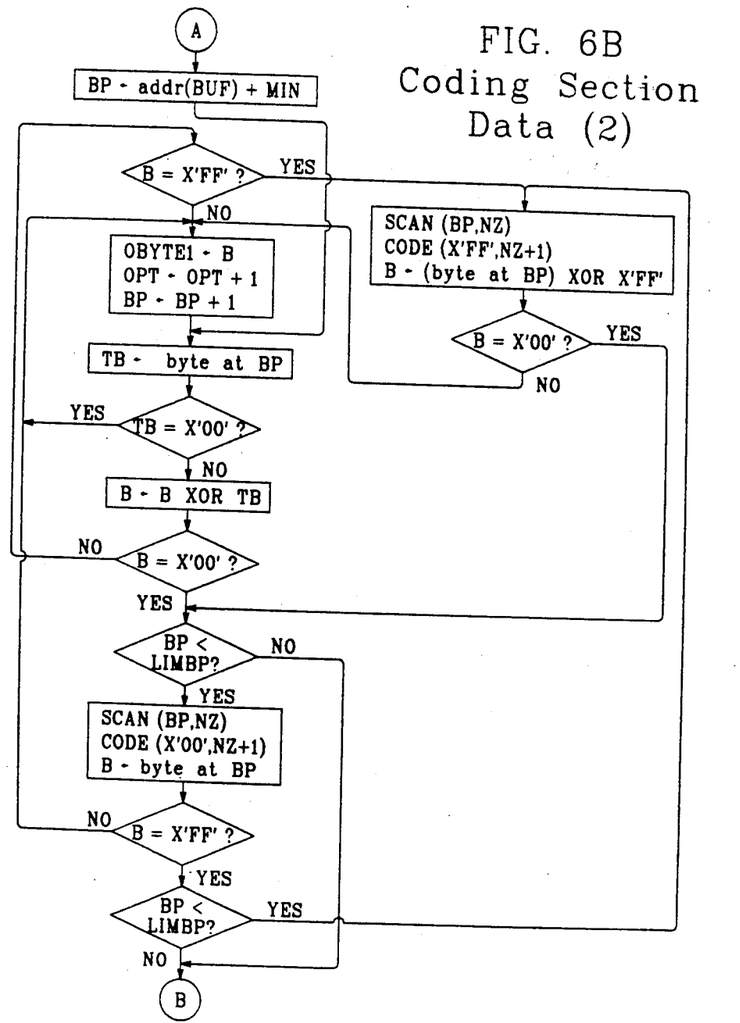
Figure 6C:
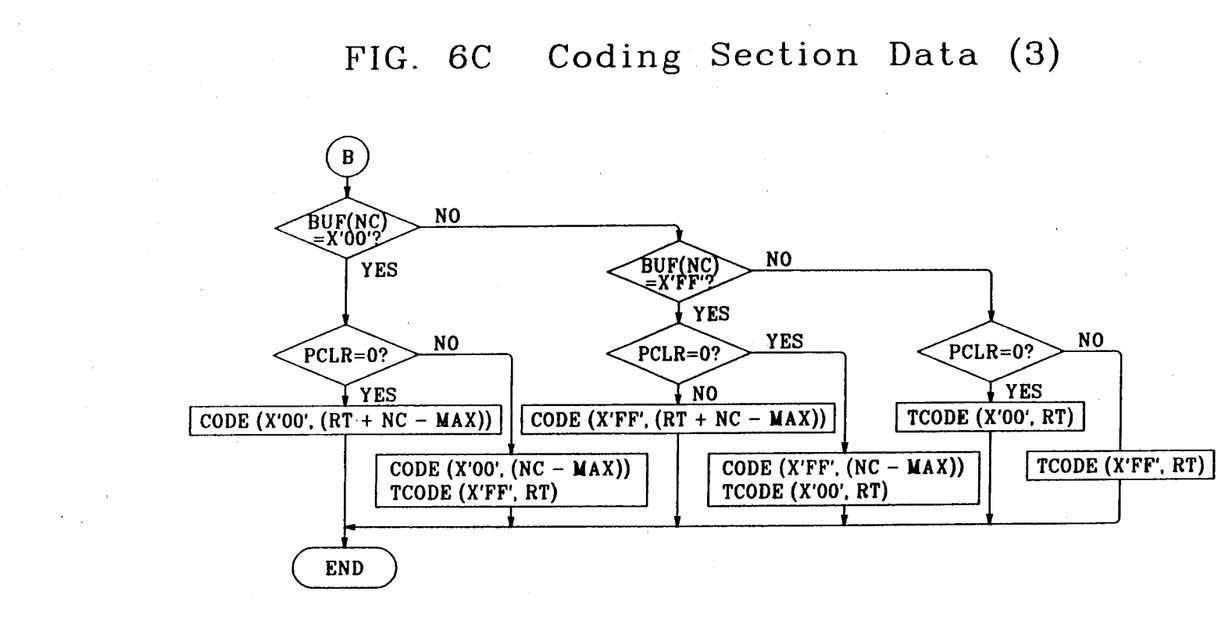

FIGS. 6A, 6B, and 6C describe the coding of the data for one section. FIG. 6A shows the coding of the left padding and an initial white or black field (if any); FIG. 6B shows the coding of the "interior" bytes; and FIG. 6C shows the coding of a final white or black field and the right padding.

The process of coding a section begins, as illustrated in FIG. 6A, with the normalization of MIN and MAX so that they can be used as indices to the buffer BUF. The pointer to the output buffer is set up. If reverse video is required, the first and last bytes in the intermediate buffer are inverted. This is sufficient to invert all of the output bytes, since if the original byte is inverted the results of successive EXCLUSIVE ORs will be the inverse of the original image data, and the inversion of the last byte causes the result of the last EXCLUSIVE OR to be zero as required by the compression process. Next, the final byte in BUF is examined. When the last output byte is EXCLUSIVE OR'd with this value, the result is zero, so the final byte is equal to the last real data byte in the section. If this byte has the value X1 FF', then the section ends with a black field. Since it is desirable to recognize that the end of the "interior" data has been reached by a test on only one path (the path which processes white bytes), the byte which initially causes B to equal the first X'FF' in the final field (BUF(MAX)) should be inverted to cause B to have the value X'00'. However, this will not work if B has the value X'00' when it reaches BUF(MAX). In that case, the inverse of BUF(MAX) would be zero, and so the scan for the white field would continue past the true end of the white data. To prevent this, BUF(MAX) retains the value of X'FF' in this case, and a second test is introduced to test for the end of the section if a white byte is immediately followed by a black byte in the intermediate buffer.

If the section does not end with a black byte, a test is performed to see if it ends with a white byte. If it does not, then it will be necessary to process the bytes of BUF until the last element of BUF is reached, so MAX is set to the buffer size to indicate this.

Next, a limit is set up for the pointer BP which will step through the "interior" bytes of BUF (from BUF(MIN) to BUF(MAX)). This value is used in testing for the end of the section data. The byte B is then initialized with the value of the first byte in the section.

If the section begins with a white byte, MAX is tested to determine if the section contains all white data. If MAX is zero, there are no run ends in the section which are between 0 and NC. In this case the entire section is white, so that information is coded (this process will be described in more detail later) and processing of the section is complete. If MAX is greater than zero, the section begins with a white field but contains some nonzero data. The left padding and the initial white field are coded, and the loop to code the "interior" points is entered.

If the section begins with a black byte, the first byte of BUF is cleared so that it will not be necessary to zero BUF between positions 0 and MIN before recording transitions from the next group of input lines. In a process similar to that used for a section beginning with a white byte, MAX is tested to determine whether the section is all black. If so, the padding and section data are coded and processing is complete; otherwise the left padding and initial field are coded and the loop to code the "interior" bytes is entered.

If the section begins with a byte which is neither black nor white, MIN is reset to zero to indicate that BUF must be processed from the beginning; B is set to zero since it will be EXCLUSIVE OR'd with BUF(0) at the beginning of the loop to code "interior" bytes; and any padding bytes required are coded. The interior loop is then entered.

FIG. 6B shows the loop which codes the "interior" bytes of the section, i.e. those between offsets MIN and MAX in BUF. As new values of B are created, they are classified as either white (X'00'), black (X'FF'), or mixed (anything else), and the appropriate point in the code is branched to.

The pointer BP is used to address successive elements of BUF. It is initialized to point to BUF(MIN), and is incremented either explicitly or by the SCAN procedure until it reaches the value LIMBP. After BP is initialized, the first byte from the intermediate buffer is read into a temporary storage location and compared to zero. If the byte is equal to zero then the previous output byte was mixed, since this point in the code is reached only if the previous byte was mixed or if the first byte is being read, and the first byte is known to be nonzero. Since B XOR 0 is equal to B, the new byte to be coded is identical to the old one and is mixed, so control goes to the part of the code which processes a mixed byte. This processing consists of storing the byte in the output buffer and incrementing the output pointer and the input pointer BP, and then continuing to the next byte.

If the next byte in the buffer is nonzero, it is EXCLUSIVE OR'd with B to obtain a new output byte. If the resulting byte is white, BP is compared to LIMBP to determine if the end of the section data has been reached. If so, the loop is exited. Otherwise BUF is scanned beginning at BP+1 to determine the number NZ of zero bytes in BUF. BP is incremented during scanning to point to the nonzero byte following the field of zeroes. Adding one to NZ to include the initial byte of the field (which had a nonzero BUF entry which created the zero byte) gives the total number of contiguous zero bytes; these are coded using CODE. B then receives the value of the nonzero byte following the zero field; this is equivalent to EXCLUSIVE ORing that byte with B, which had the value zero. B must now be either black or mixed. If B is mixed, control passes to the code which processes mixed bytes. If B is black, it is necessary to test again to see if the end of the data has been reached, as discussed above. If so, the loop is exited; otherwise control passes to the part of the code which processes black bytes.

The portion of the code which processes black bytes may be entered either directly, after a white field has been processed, or via a test which separates mixed bytes from black bytes after an element of BUF has been EXCLUSIVE OR'd with a mixed B. As in the procedure for processing white bytes, BUF is scanned beginning at BP to determine the length of the black field; BP is set to the first nonzero byte in BUF following this field. The appropriate number of black bytes is then coded, and B is reset by EXCLUSIVE ORing the element of BUF addressed by BP with B (which has the value X'FF'). The resulting value is either white or mixed; a test determines which portion of the code to branch to.

FIG. 6C shows the procedure for coding a final black or white field and the padding on the right edge. The last element of BUF is examined to determine the color of the last data byte in the line; since this element EXCLUSIVE OR'd with the last data byte must be zero, the two must be equal. If the last data byte is white, PCLR is examined to determine whether black or white padding is required. If white padding is required, the number of bytes in the field is the sum of the number of padding bits required and the length of the original field. This length is given by NC−MAX and is at least one (since the last byte is white). If black padding is required, the length of the white field is coded and then the padding bytes, if any, are coded separately.

Similarly, if the last data byte is black, PCLR is examined to determine the color of any padding bits. For black padding, the pad length and the black field length are summed to obtain the number of bytes to be coded; for white padding, the black field length is coded and then the padding bytes, if any, are coded.

If the last data byte is mixed, PCLR is tested and the appropriate color of padding bits are coded if RT is nonzero.

This completes the compression of the data from one section.

Figure 7:
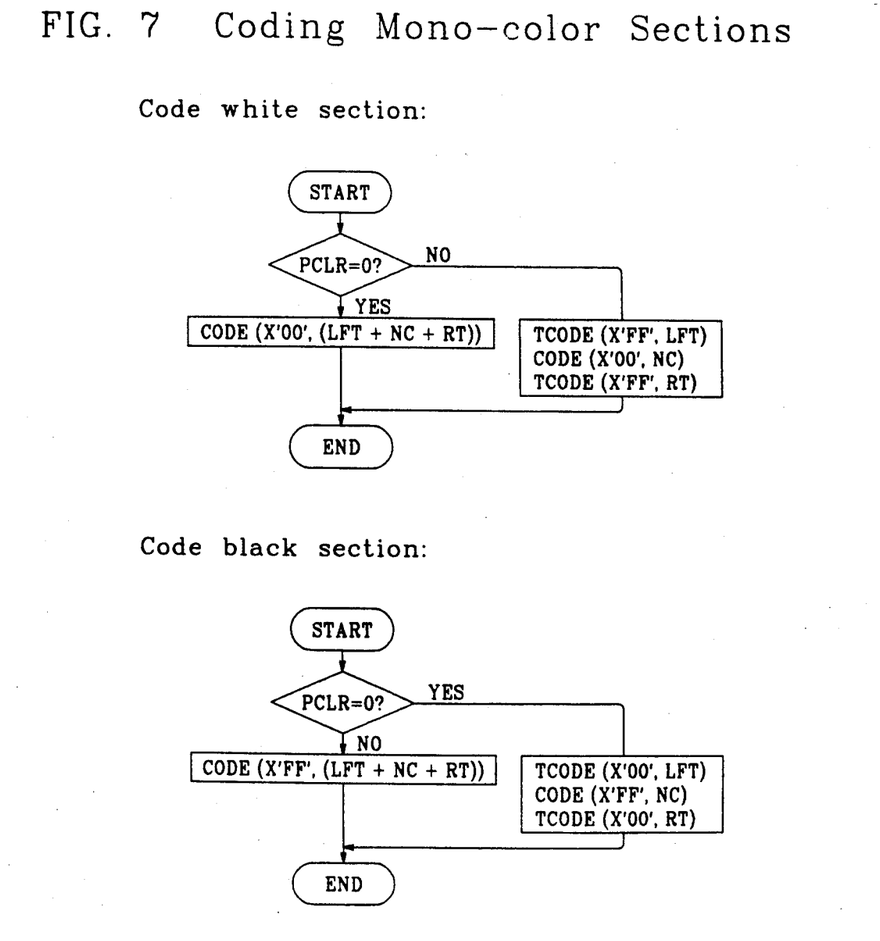
FIG. 7 shows a method for coding entire sections of X'00' or X'FF' bytes.
Figure 8:
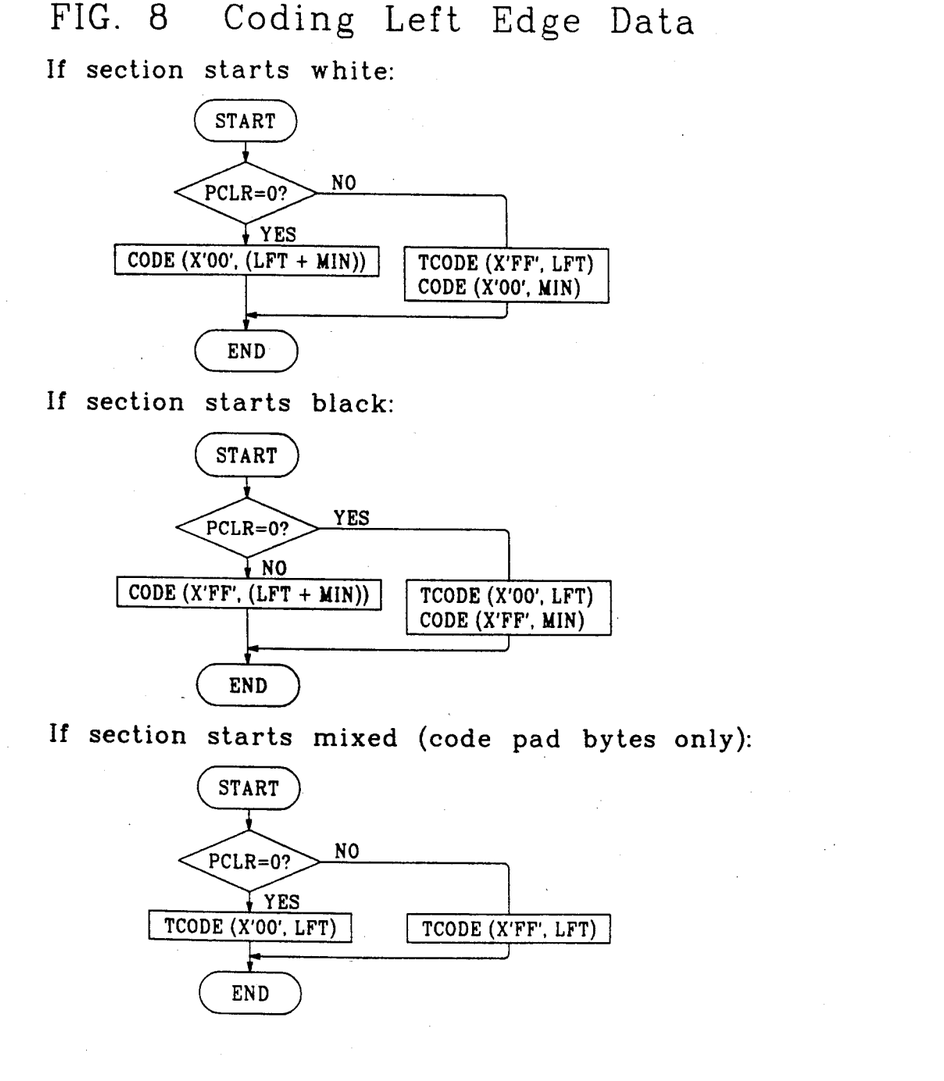
FIG. 8 shows the procedure for coding the data on the left edge of the section.

FIGS. 7 and 8 show details of some of the processes outlined in FIG. 6A. FIG. 7 shows the procedures for coding a section consisting entirely of white bytes or entirely of black bytes. For a white section, the pad color PCLR is tested; if the padding color is white, the length of the white field is the sum of the number of bytes in the section and the left and right padding lengths. If the padding color is black, then the padding must be coded separately and the padding widths must be tested to see if they are nonzero before coding. (Because of the restrictions outlined with reference to FIG. 3, NC must be greater than zero, so no test is required before coding a field of NC bytes.) To code a black section, the conditions are reversed, i.e., if the padding is black, the section may be coded in one operation, otherwise the white padding must be coded separately with appropriate tests.

FIG. 8 shows the procedures for coding the left padding bits and an initial white or black field for a section which is not mono-colored. If the section begins with a white field, PCLR is tested. If the padding color is white, the padding and the white field (of length MIN) may be coded together. Otherwise the padding must be coded separately with a test to determine whether the padding width is nonzero before coding; after this has been done, the white field is coded.

The procedure for a section which begins with a black field is similar. If the pad color is black, the padding and field widths are combined for coding; otherwise they are coded separately. When a section begins with a byte which is neither white nor black, only the padding must be coded before entering the loop to code the interior bytes; PCLR is tested and (if the padding width LFT is greater than zero) padding bytes of the appropriate color are coded.

Figure 9:
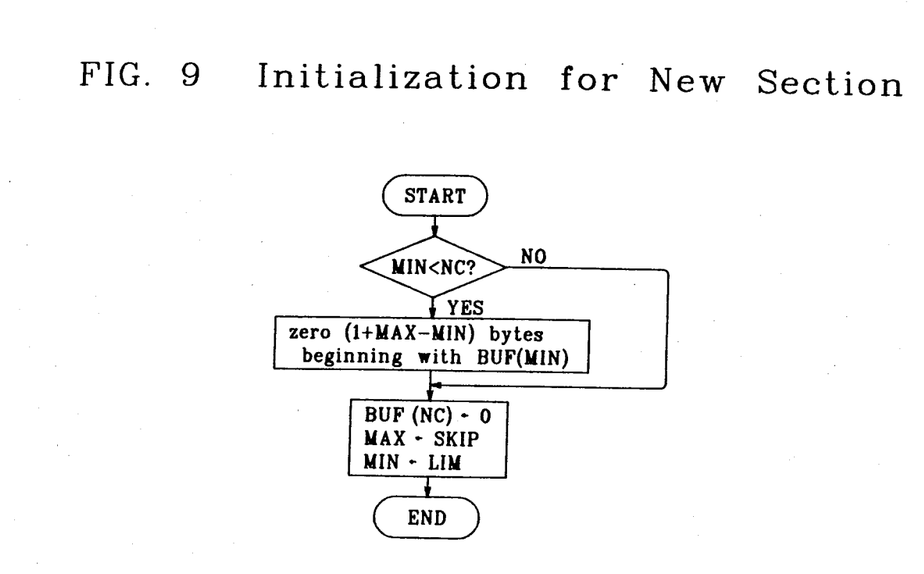
FIG. 9 shows the initialization required between the coding of one section and the next.

FIG. 9 shows the initializations required after a section has been processed in order to prepare for the next section. If the image data for the section which has just been compressed is not mono-colored (i.e. at least one run end exists between 0 and NC), the portion of BUF which contains nonzero entries must be zeroed. This portion extends from position MIN to position MAX and is 1+MAX-MIN bytes in length. In any case, the last byte of BUF is zeroed. MAX and MIN are reset to SKIP and LIM respectively, so that any run end greater than SKIP will be recorded in MAX and any run end less than LIM will be recorded in MIN.

If the compression for the 4250 printer is not required (i.e., only the transposition is to be done), the method above may be simplified. For processing the padding and mono-color sections at the ends of lines, the "CODE" procedure shown in FIG. 5 is modified to write CT copies of BYTE into the output buffer, incrementing the pointer appropriately. The main loop illustrated in FIG. 6B is reduced to a very simple loop which reads the next byte into TB, EXCLUSIVE ORs it with B (the preceding steps may be combined for many processors), tests for the end of line if B is zero and exits if the end of line is found, and otherwise loops around to store B and increment the input and output pointers. Alternatively, the method of forcing B to become zero at the end of the line may be discarded and BP may instead be compared against LIMBP on every iteration of the loop. Since for this case the buffer and the output data are comprised of the same number of bytes, the output may be constructed directly in the buffer (or equivalently, the buffer may be overlaid on the output storage area) if desired. In that case the same pointer can be used to address the input and output data.

Many other variations and enhancements of the basic method are possible. For example, the output data can be caused to represent the transpose of the image formed by mirroring each section about the vertical axis rather than the transpose of the original section. This can be done either by reading the bytes of the buffer in reverse order as the section data is read out in the loop of FIG. 6B, or by storing the run end data in reverse order in the buffer by using the additive inverse of each run end instead of the run end itself as an index for the byte to be masked in the procedure shown in FIG. 4 (the base pointer to which the index is added must be adjusted appropriately to point to or beyond the end of the buffer in this case). Note that the transposed mirrored image is equivalent to the original image rotated 90 degrees counterclockwise. A 90 degree clockwise rotation can be achieved by using the rows of the original image in reverse order to obtain data to be entered into the intermediate buffer, effectively mirroring the image data about the horizontal axis before transposing it.

It will accordingly be seen that a system and method have been disclosed which create transposed or rotated raster data, or 4250 section files, working directly with the run end form of the input binary image data, by recording the image transitions in an intermediate buffer and then using the bytes of that buffer to invert bits to create the output raster data. Advantageous features inherent in the disclosed method include the ability to skip over mon-colored fields at the margins of a document, facility in inverting all of the bits in the original image, and an efficient and straightforward implementation in software.

We claim:

1. A method for formatting electronic binary image data into transposed or rotated raster form, comprising:
    assembling in the storage elements of a first buffer electronic image-indicative data in the form of vectors of run ends representing successive raster scan lines of an original image to be reproduced;
    initializing to zero the storage elements of an intermediate buffer capable of containing one bit corresponding to each pel in the image to be transposed or rotated;
    entering said electronic data into said intermediate buffer by using each run end in said first buffer to set the bit in said intermediate buffer corresponding to the pel position at which the run ends;
    combining the elements of said intermediate buffer containing said entered electronic data with one another in sequence to create raster data; and
    storing said raster data generated by the above-recited steps.

2. A method as in claim 1 wherein said combining step comprises EXCLUSIVE-ORing said elements of said intermediate buffer.

3. A method as in claim 2 further comprising the step of inverting the bits of the initial storage element of said intermediate buffer before said combining step, so as to create a transposed representation of said original image with all bits inverted.

4. A method as in claim 1 wherein said combining step further comprises compressing said raster data.

5. A method as in claim 1 wherein said entering step further comprises omitting the entering of run ends outside of a predetermined range of interest, so as to produce clipping of the pels from at least one edge of said original image.

6. A method as in claim 1 wherein said combining step further comprises inserting pad data at at least one of the ends of said raster data, creating padding on at least one edge of said original image.

7. A method as in claim 1 wherein said entering step further comprises storing information on the position in said intermediate buffer of the bits set nearest at least one of the ends of said intermediate buffer, and said combining step further comprises using said stored information to omit the portion of the processing required to determine the value of said raster data respectively for at least one of the leading and trailing sequences of identical lines in said raster data.

8. A method as in claim 1 wherein said entering step further comprises entering said run end raster positions in reverse order in the elements of said intermediate buffer, so as to create a transposed representation of said original image mirrored about the horizontal axis.

9. A method as in claim 1 wherein said combining step further comprises combining said elements of said intermediate buffer in reverse order, so as to create a transposed representation of said original image mirrored about the horizontal axis.

10. A method as in claim 1 wherein said raster data comprises transposed raster data.

11. A method as in claim 1 wherein said raster data comprises rotated raster data.

12. A system for formatting electronic binary image data into transposed or rotated raster form, comprising:
    a first buffer having a set of storage elements;
    means for assembling in the storage elements of said first buffer electronic image-indicative data in the form of vectors of run ends representing successive raster scan lines of an original image to be reproduced;
    an intermediate buffer comprising storage elements containing one bit corresponding to each pel in the image to be transposed or rotated;
    means for initializing the elements of said intermediate buffer to zero;
    means for entering said electronic data into said intermediate buffer by using each run end in said first buffer to set the bit in said intermediate buffer corresponding to the pel position at which th run ends;
    means for combining the elements of said intermediate buffer containing said entered electronic data with one another in sequence to create raster data; and
    means for storing said raster data.

13. A system as in claim 12 wherein said combining means comprises means for EXCLUSIVE-ORing said elements in said intermediate buffer.

14. A system as in claim 12 wherein said combining means further comprises means for compressing said raster data.

15. A system as in claim 13 further comprising means for inverting the bits of the initial storage element of said intermediate buffer before the operation of said combining means, so as to create a transposed representation of said original image with all bits inverted.

16. A system as in claim 12 wherein said entering means further comprises means for omitting the entering of run ends outside of a predetermined range of interest, so as to produce clipping of the pels from at least one edge of said original image.

17. A system as in claim 12 wherein said combining means further comprises means for inserting pad data at at least one of the ends of said raster data, creating padding on at least one edge of said original image.

18. A system as in claim 12 wherein said entering means further comprises means for storing information on the position in said intermediate buffer of the bits set nearest at least one of the ends of said intermediate buffer, and said combining means further comprises means for using said stored information to omit the portion of the processing required to determine the value of said raster data respectively for at least one of the leading and trailing sequences of identical lines in said raster data.

19. A system as in claim 12 wherein said entering means further comprises means for entering said run end raster positions in reverse order in the elements of said intermediate buffer, so as to create a transposed representation of said original image mirrored about the horizontal axis.

20. A system as in claim 12 wherein said combining means further comprises means for combining said elements of said intermediate buffer in reverse order, so as to create a transposed representation of said original image mirrored about the horizontal axis.

21. A system as in claim 12 further comprising means for providing said raster data as an input to an output printing device.

22. A system as in claim 12 further comprising means for providing said raster data as an input to an output display device.

* * * * *